Jan. 4, 1955 S. O. RYGÅRD 2,698,524
HEAT TRANSFER BETWEEN TWO MEDIA ACCORDING
TO THE CARNOT PRINCIPLE
Filed April 8, 1950 2 Sheets-Sheet 1
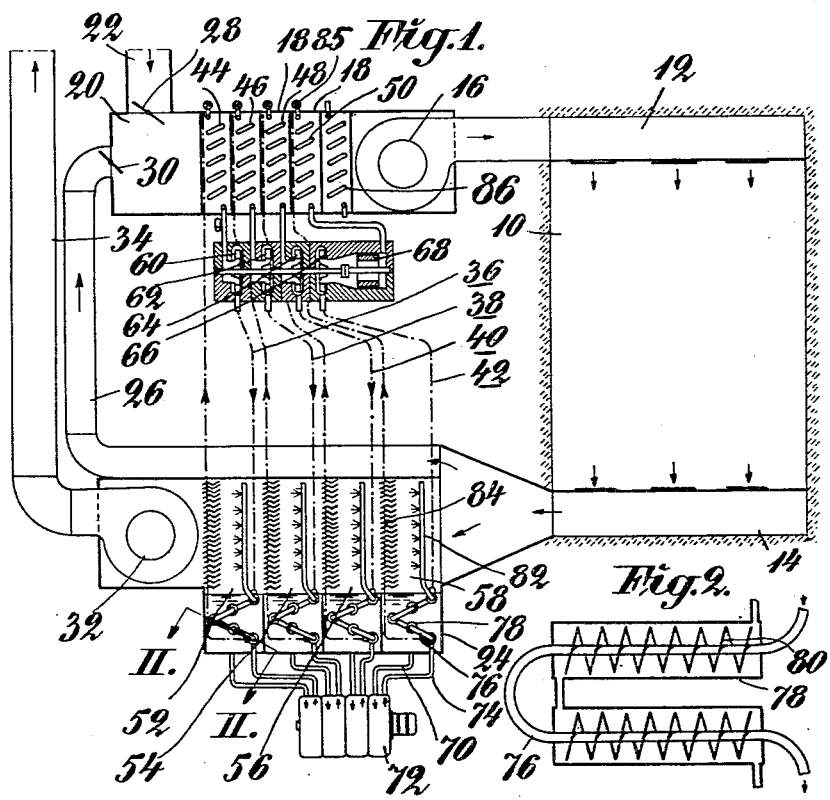
INVENTOR
ATTORNEY Jan. 4, 1955  S. O. RYGÅRD  2,698,524
HEAT TRANSFER BETWEEN TWO MEDIA ACCORDING
TO THE CARNOT PRINCIPLE
Filed April 8, 1950  2 Sheets-Sheet 2
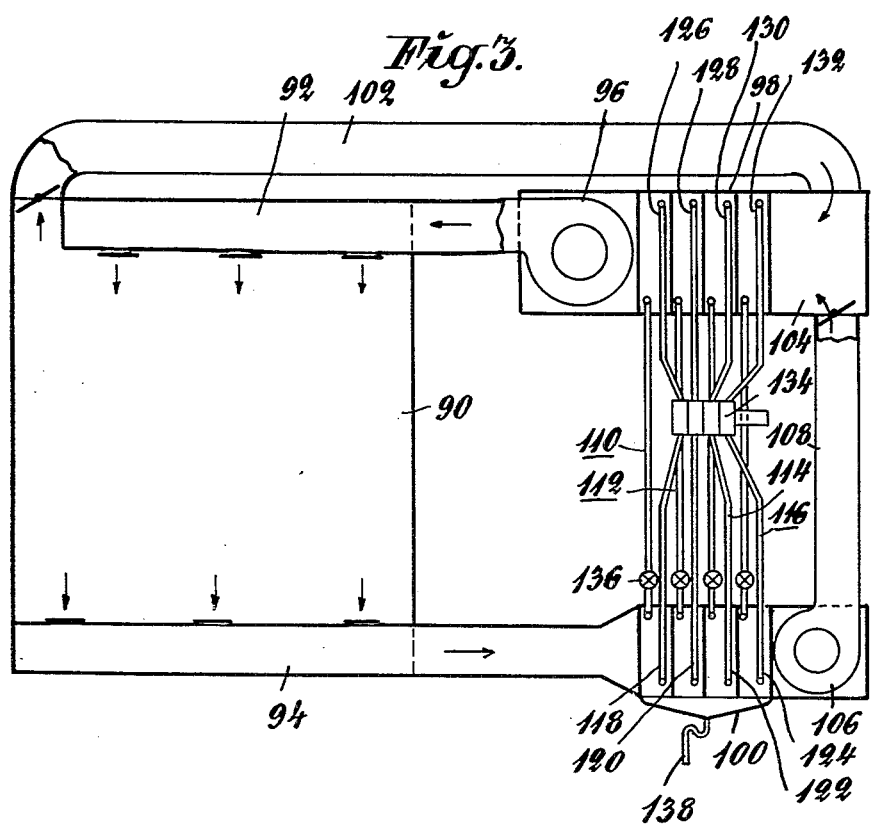
INVENTOR
Sune Desian Rygård
BY
his ATTORNEY

United States Patent Office 2,698,524
Patented Jan. 4, 1955

2,698,524

HEAT TRANSFER BETWEEN TWO MEDIA ACCORDING TO THE CARNOT PRINCIPLE

Sune Ossian Rygård, Stockholm, Sweden

Application April 8, 1950, Serial No. 154,764

Claims priority, application Sweden April 14, 1949

11 Claims. (Cl. 62—129)

This invention relates to method and means for the transfer of heat between two media according to the Carnot principle. This principle embodies the fact that a fluid in a so-called heat pump is caused to circulate in a closed circuit, where the fluid is caused in one part of the circuit to condense at a higher pressure at a corresponding constant temperature, and is caused in another part of the circuit to evaporate at a lower pressure at a corresponding lower temperature, which is likewise constant.

Of the two media the heat yielding medium, that is to say the medium the heat content of which is to be reduced, is brought into heat exchanging relation with the last-mentioned part of the closed circuit of the heat pump, whereas the other medium, which is thus to absorb heat, is in a heat-exchanging relation with the first-mentioned part of the circuit. The temperature of evaporation of the fluid must be selected so that it is lower than the temperature of the heat yielding medium in the evaporating part of the system by a certain value, it being taken into account that a drop in temperature is required to attain the desired heat transmission with reasonable heat transferring surfaces. Moreover the medium most frequently alters its temperature itself upon contact with the part under consideration. In the same way the temperature of condensation of the fluid must be some degrees above the temperature of the heat absorbing medium and above its ultimate temperature, respectively. The circulation of the fluid in the heat pump is accomplished with the aid of a compressor. The relation between the heat quantity, removed in the system and the work performed by the compressor, as expressed by the same unit of energy, may be called the coefficient of performance, which thus constitutes a measure of the output gained. In properly devised plants, for instance for air conditioning of the type hitherto known, said factor may amount to 9.

The principal object of the invention is to provide a process operating according to the Carnot principle and yielding an output considerably improved in comparison with the outputs hitherto obtained. It is known to carry out such a process with a plurality of heat pumps, each of which contains a fluid circulating by means of a compressor in a closed circuit between an evaporating station and a condensing station, there being intervals between the evaporating and condensing temperature located at different levels in the various heat pumps. The media are brought into a heat exchanging relation with the heat pumps in such a sequence that the heat yielding medium meets fluids at the evaporating stations with successively lower temperatures of evaporation and the heat absorbing medium meets fluids at the condensing stations with successively higher temperatures of condensation.

It is the main object of this invention essentially to improve the output of a process of this kind by so determining the heat pumps in relation to the initial temperatures of the two media, that the highest temperature of the colder medium is higher than the lowest temperature of the warmer medium during their passage through the stations. Another object of my invention is to provide an air conditioning system, which is more economical in operation than are the systems hitherto used in practice.

Further objects and advantages of the invention will be apparent from the following description considered in connection with the accompanying drawings, which form a part of this specification, and of which:

Fig. 1 is a more or less diagrammatic and in part sectional view of an air conditioning plant, embodying my invention.

Fig. 2 is a sectional view taken on the line II—II of Fig. 1 on an enlarged scale and Fig. 3 is a diagrammatic view of a drying plant operating in accordance with the invention.

In Fig. 1, 10 designates a chamber, the temperature of which is to be maintained at a certain level lower than that of the external air. The chamber in consideration has an inlet duct 12 for the conditioned air and a discharge duct 14 for the escaping air. The duct 12 communicates through a fan 16, a receptacle 18 which contains evaporators, and through a mixing chamber 20 with an air intake 22 from the external air. Extending from the duct 14 are two branches, one of which passes through a condenser system 24, while the other is connected to a return passage 26 opening into the mixing chamber 20.

By means of dampers 28 and 30 in the air intake 22 and the return passage 26 the relation is regulated between the quantity of external air and returned air blown by the fan 16 into the chamber 10. The air passing through the condenser system 24 escapes into the atmosphere by means of a fan 32 and through a conduit 34.

In the present case, the plant comprises four heat pumps operating in parallel and generally designated by 36, 38, 40 and 42. Each one of these heat pumps comprises an evaporator 44, 46, 48 and 50, respectively, and a condenser 52, 54, 56 and 58, respectively. They are connected with each other in pairs by means of conduits, as indicated by dash and dot lines in Fig. 1, said conduits containing compressors 60, 62, 64 and 66. In the embodiment shown, said compressors are built into a common casing, which also encloses a driving motor 68, it being understood that said compressors shall be completely heat-insulated from each other. However, each heat pump may have a separate compressor with a driving motor for the same. The lower portion of the condensers 52—58 forms a collecting basin for water, which from each condenser is discharged through a conduit 70 and by means of a pump 72 is conveyed through a conduit 74 and a coil 76. The gaseous fluid coming from the evaporator is caused to flow in jackets 78 enclosing the coil 76 (Fig. 2), said jackets containing members providing extended heat exchange surface, for instance in the form of spirally bent fins 80 which are in heat conducting contact with the coil 76, and which impart to the fluid a helical motion about the coil. The coil 76 has a small internal diameter, so that the water will have a relatively high velocity (greater than 0.5 to 1 meter per second) and thus a high rate of heat transfer to the coil. On the other hand, the area of the heat transferring surfaces is considerably greater in the jacket 78 and thus compensates for the lower rate of heat transfer from the fluid to the walls of the jacket. Through the heat exchange between the water in the coil 76 and the fluid in the jackets 78 this fluid is transformed to liquid state, the heat of condensation being absorbed by the water. The latter is then conveyed to nozzle banks 82 located in the air passage of the condenser system 24, said nozzle banks being provided with a number of fine exit apertures for the water.

The comparatively cold and dry air escaping from the duct 14 is utilized to cool the water, when the latter is introduced in an atomized state into the air through the nozzle banks 82. It is true that the coefficient of heat transfer between the water drops and the air is very low, but at the same time the total heat transfer surface is very large, so that the requisite quantities of heat can be transferred in this manner at very low temperature differences. When the relatively dry air meets the atomized water in the first condenser unit 58, it will be saturated by moisture, the temperature of the air consequently decreasing, as of course is also the case with the water temperature. The liquid drops which are not evaporated are collected in the basin of the condenser 58. Arranged at the outlet side of the air passage in each condenser is a water removing grate 84 in the form of parallel bent plates of known type, said grate having for its object to counteract the escape of the water drops from the condenser and their transfer to the next condenser, where other temperature conditions prevail. The lower portions of the condenser made in the form of a basin are, like the various pumps of the unit 72, completely heat insulated from each other.

After the fluids of the heat pumps have condensed in the condenser system 24, they are conveyed in a liquid state to the evaporators 44—50, where they are again evaporated. The various fluids are thus compressed by the compressors 60—66 while still in a gaseous state, so that a higher pressure and a higher temperature in consequence thereof prevail in the condenser part of the heat pumps than in the evaporator part thereof. The return conduits for the liquefied fluid have expansion valves 85 arranged therein in known manner to maintain this difference in pressure. The individual heat pumps 36—42 operate with different condensing and evaporating temperatures, for which purpose the same fluid, such as Freon ($F_{12}$), may be used, while the pressures in the individual heat pumps and in their condensers and evaporators are varied. Thus the evaporator 44 of the heat pump 36, which is the first to meet the mixture of air entering from the chamber 20, has the highest temperature. After that, the temperatures of the evaporators 46—50 fall successively and uniformly as far as possible. In the same manner, the condenser 52 pertaining to the heat pump 36 has the highest temperature, which then likewise decreases toward the condenser 58 as uniformly as possible, the latter condenser being the first to meet the air escaping from the duct 14. It is particularly advantageous to select the temperature drops between the evaporators 44—50 so as to be equal to the temperature rises between the condensers 58—52.

It is assumed that the external air drawn in through the intake 22 has a temperature of 35° C. The chamber 10 should have a temperature of 28° prevailing therein, and consequently the temperature of the air escaping from the duct 14 is also 28° C. If one half of the quantity of air coming from the duct 14 is caused to pass through the condenser system 24, while the other half returns to the mixing chamber 20, the temperature of the air mixture in the chamber 20 obviously becomes about 31.5° C. The evaporators 44—50 may have evaporating temperatures of 19, 16, 13 and 9.5° C., respectively, due regard being given to the temperature differences required for the heat transfer. The air is cooled down successively by the evaporators to 18° C., which temperature is necessary to compensate for the heat produced in the chamber or leaking in from the outside. The external air passing through the intake 22 is assumed to have a relative percentage of moisture of about 52%, and the air in the chamber 10 adjusts itself to a percentage of moisture of about 48% on having been mixed with the cooled air taken in from the duct 12. Through the contact with the evaporators 44—50 a portion of the moisture content of the mixing air is precipitated.

The air leaving the duct 14 consequently has a temperature of about 28° C. and a percentage of moisture of about 48% when entering the condenser 58. When the air is saturated with moisture through its contact with the atomized water drops injected into the air passage, its temperature falls to a considerable extent, in the present case to about 20° C. The heat pump 42 may have a condensing temperature as low as 26° C. This temperature then rises in the condensers 56, 54 and 52 to 29, 32 and 35° C., respectively. The air, on the other hand, undergoes a rise in temperature while absorbing heat from the fluids of the heat pumps. This rise in temperature amounts to about 3° C. in every condenser, so that the final temperature of the air, when discharged into the atmosphere, is about 32° C. During the passage through the condenser system 24, the moisture content of the air practically follows the curve of saturation.

In Fig. 1, 86 designates a heat battery for heating the air, for instance, when the weather is cold. As will appear from the above, water must be supplied to the condenser system 24 in a quantity corresponding at least to the evaporation.

As will be evident from the aforesaid the ranges of temperature of the two media when passing the heat pumps are to a great extent overlapping, or in other words, the initial temperature of the fresh air mixture in the chamber 20 is only lower by a few degrees centigrade than the end temperature of the exhaust air after it has passed the condenser system 24. The difference between the highest temperatures and the lowest temperatures, respectively, of the two media may be of the same order as the intervals between the evaporating and condensing temperatures, respectively, of the heat pumps or even less. The coefficient of performance is improved from 9 to about 18, which consequently involves a doubling of the output. By dividing the process into a plurality of parallel steps with temperature intervals according to the aforesaid, the ratios of compression in the individual heat pumps become comparatively low, it being thus possible to use centrifugal compressors and the like to advantage even in small and average-sized air conditioning plants, which hitherto, as a rule, would be provided with reciprocating compressors calling for a large space which rendered the plants correspondingly expensive. The invention also results in a considerable reduction of the costs of the plant.

The best result will be obtained when the lowering of the temperature of the heat yielding medium between each step in the process is equal or nearly equal to the increase in temperature between each step of the heat-absorbing medium. If the two media have different values of specific heat, the masses are selected in reversed proportion thereto. This is also the case if a certain temperature change corresponds to a different quantity of heat, as is the case when air is cooled by contact with surfaces of a temperature lower than the dew-point for moisture contained in the air. If the heat absorbing medium is a gas, primarily air, the same result may be attained by the evaporation of a liquid, primarily water, in the gas.

The drying plant shown in Fig. 3 comprises a room or chamber 90, in which the goods to be dried, such as paper pulp or wood, are placed. The chamber has an inlet channel 92 and an outlet channel 94 for the drying air, the first-mentioned channel communicating through a fan 96 with a condenser system 98. The channel 94 communicates with an evaporator system 100. Extending from the drying chamber 90 is a conduit 102, which opens into a mixing chamber 104 adjacent to the inlet side of the condenser system 98, said chamber also communicating with the evaporator system 100 through a fan 106 and a conduit 108. The condenser and evaporator systems comprise a number of heat pumps, in the present case four heat pumps, generally designated by 110, 112, 114 and 116, each having an evaporator 118, 120, 122 and 124, respectively, and a condenser 126, 128, 130, and 132, respectively, as well as a compressor plant 134 which may be of the type described above. Expansion valves 136 are incorporated in the return conduits for the liquids formed in the condensers.

It is assumed that the air attains a temperature of 35° C. and a relative humidity of 80% by the absorption of moisture from the goods to be dried, which is thus the condition of the air when it enters the channel 94 and the conduit 102. The air carried off from the drying chamber is successively brought into contact with the evaporators 118—124 in the evaporator system 100, such air being thus cooled in steps, preferably at equal intervals, down to 29° C. At the same time water is precipitated and escapes through a conduit 138. To obtain this cooling effect, the first evaporator has an evaporation temperature of about 26° C., which then falls successively in the other evaporators by somewhat more than 1° C. that is to say to 22° C. in the evaporator 124. In the chamber 104, this cooled air is mixed with air coming directly from the drying chamber through the conduit 102, preferably in a proportion smaller than 1:1, in the present case 1:2. The air mixture thus attains a temperature of 33° C. and a relative moisture content of 84%. The air mixture passes through the condensers 132—126 in the order mentioned, and is heated to 39° C. with a relative moisture content of 60%. By mixing moist air from the drying chamber with the air dried and cooled by the evaporators the increase of heat in the condenser system is reduced, and thus it is possible to choose the lower condensing temperatures. In the present instance they are at 41 and 45° C. for the first and the last condenser, respectively.

A plant of this type permits precipitation of approximately 8.5 kilograms of water for every kw.-hour consumed, which is far more than is possible with other methods hitherto known.

A drying process may also be operated according to the invention in such manner that the drying air is caused between each condenser step to pass through a compartment in the drying chamber to reduce the temperature thereof.

In each such compartment there prevails a successively higher temperature, considered in the direction of flow of the air. In this case no admixture of drying chamber air to the cooled air coming from the evaporator system need take place prior to the entrance into the first condenser.

The invention may also be applied when heat calories are to be utilized in a heat magazine for seating purposes. As an example of this, mention may be made of the utilization of the heat of the exhaust air from a cowshed for heating cold external air for ventilating purposes. It may be assumed that a temperature of 20° C. is maintained in a cowshed, the air having a relative humidity of 60%. This air is caused to pass through the evaporators of a heat pump comprising parallel stages in accordance with the invention, said evaporators having an evaporation temperature falling in steps, the air being cooled thereby to 8.5° C., for example. At the same time external air will flow in the opposite direction through the condensers of the pumps, said external air having, for instance, a temperature of —6° C. This air is heated by the heat collected from the cowshed air and attains, on having passed through the last condenser, a final temperature of 11° C. In this case the heat pumps may have an interval of only about 11° C. between the evaporation and condensing temperatures, the evaporation temperature of the heat pump operating at the highest temperature interval being 20° C., thus approximating the intake temperature of the air coming from the cowshed, while the condensing temperature of the heat pump operating within the lowest temperature interval is 0° C. The performance factor, which is in this case next to a factor of heat, becomes as high as 26.4.

For the purpose of generating heat, the invention may also be combined with a heat motor operating the compressor plant of the heat pump comprising parallel stages where the cooling water and exhaust heat of said motor, if the same is an internal combustion motor, or the exhaust steam or condenser heat, if the same is a steam motor, are then utilized for the supply of heat in addition to the condenser heat of the heat pump comprising parallel stages, to a drying process, for example.

In the embodiment according to Figs. 1 and 2, it is possible to introduce only external air into the evaporator system, in which case the return passage 26 is omitted.

While several more or less specific embodiments of the invention have been shown, it is to be understood that this is for purpose of illustration only, and the invention is not to be limited thereby, but its scope is to be determined by the appended claims.

What I claim is:

1. The method of transferring heat between a heat absorbing medium and a heat yielding medium by the aid of a plurality of heat pumps each containing a fluid circulated in a closed circuit between an evaporating station and a condensing station at higher pressure than the evaporating station, which comprises maintaining both the evaporating temperatures and the condensing temperatures of different pumps at different levels with respect to the comparable temperatures of the other pumps, passing the heat yielding medium through evaporating stations of progressively lower evaporating temperature, passing the heat absorbing medium through condensing stations of progressively higher condensing temperature and maintaining the evaporating and condensing temperatures of the fluids at the several individual stations so related to each other and to the inlet temperatures of the two media that the highest temperature of the heat yielding medium is higher than the lowest temperature of the heat absorbing medium during the passage of the media through the stations, whereby to produce overlapping temperature ranges of the heat absorbing and heat yielding media.

2. A method according to claim 1 including the step of supplying the two media to the evaporating and condensing stations in such quantities that the fall of temperature of the heat yielding medium is of the same magnitude as the temperature rise of the other medium at the stations of the individual heat pumps.

3. A method according to claim 1 in which the two media are air of different temperature and moisture condition, the step of supplying moisture to the heat absorbing medium so as to increase its moisture content, before it enters a condensing station.

4. A method according to claim 3, including the step of adding a volatile liquid to the heat absorbing gaseous medium so as to decrease the entrance temperature thereof and a rise of temperature, respectively during the passage through the condensing stations.

5. A method in air conditioning of rooms according to claim 1, including the steps of utilizing the air escaping from the room for the condensation of the fluids of the heat pumps at the condensing stations and supplying moisture at each of said stations to reduce the temperature of the air thereat.

6. A method in the drying of materials by means of air circulating in a closed circuit, according to claim 1, including the steps of supplying air of the condition of the drying chamber to air that has passed the evaporating stations of the heat pumps, and causing the mixture of air thus formed to pass through the condensing stations of the heat pumps.

7. A method according to claim 6, including the step of producing a mixture containing more air taken from the drying chamber than that coming from the evaporating stations.

8. An apparatus of the class described in which heat is exchanged between a heat yielding medium and a heat absorbing medium including a plurality of heat pumps, each of which contains a fluid circulating by means of a compressor in a closed circuit between an evaporating station and a condensing station, there being temperature differences between the respective evaporating and condensing temperatures in the several pumps, said pumps receiving the heat yielding medium at evaporating stations having successively lower evaporating temperatures and receiving the heat absorbing medium at condensing stations having successively higher condensing temperatures, the temperatures of the evaporating and condensing stations being so related that the highest temperature of the colder medium is higher than the lowest temperature of the warmer medium during their passage through the apparatus.

9. An apparatus according to claim 8, wherein the heat absorbing medium is air, in which the condensing stations comprise a heat exchanger with separate passages for the fluid and a volatile liquid, a conduit being extended to the air passage of the first condensing station and provided with means for supplying the liquid in an atomized state into the air when entering said station.

10. An apparatus according to claim 9, in which a conduit for the supply of atomized liquid is provided in each of the condensing stations.

11. Means according to claim 9, in which the liquid passage of the heat exchanger and the conduit are connected to one and the same pump adapted to convey the liquid from a collecting receptacle located underneath the air passage, through the heat exchanger, and out through the conduit.

References Cited in the file of this patent

UNITED STATES PATENTS

| Number | Name | Date |
|---|---|---|
| 1,119,011 | Grosvenor | Dec. 1, 1914 |
| 2,008,407 | Stoever | July 16, 1935 |
| 2,071,178 | Roessler | Feb. 16, 1937 |
| 2,091,563 | Palmer | Aug. 31, 1937 |
| 2,212,356 | Shure | Aug. 20, 1940 |
| 2,241,060 | Gibson | May 6, 1941 |
| 2,376,859 | Benn | May 29, 1945 |
| 2,463,881 | Kemler | Mar. 8, 1949 |